Patented Jan. 25, 1927.

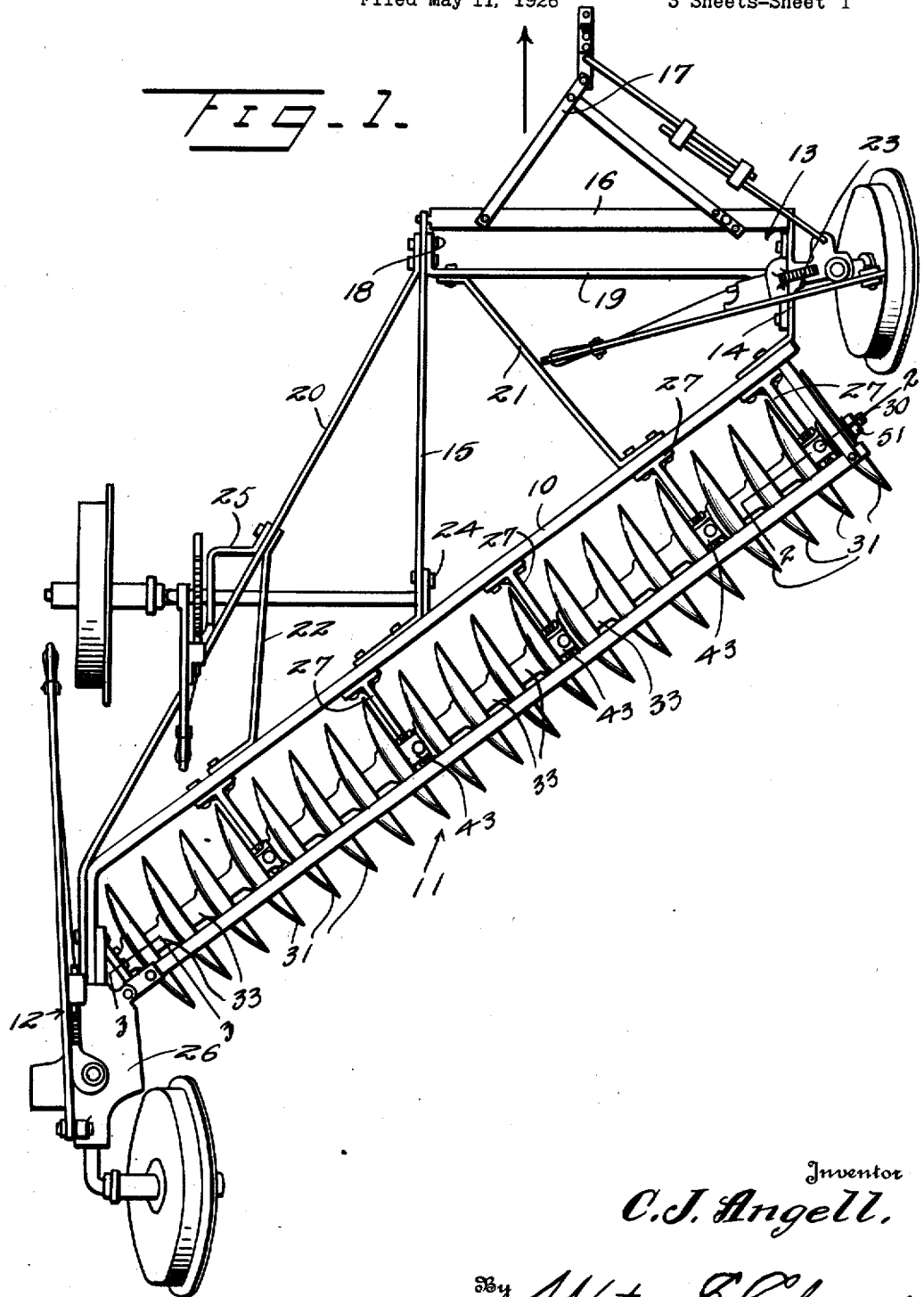

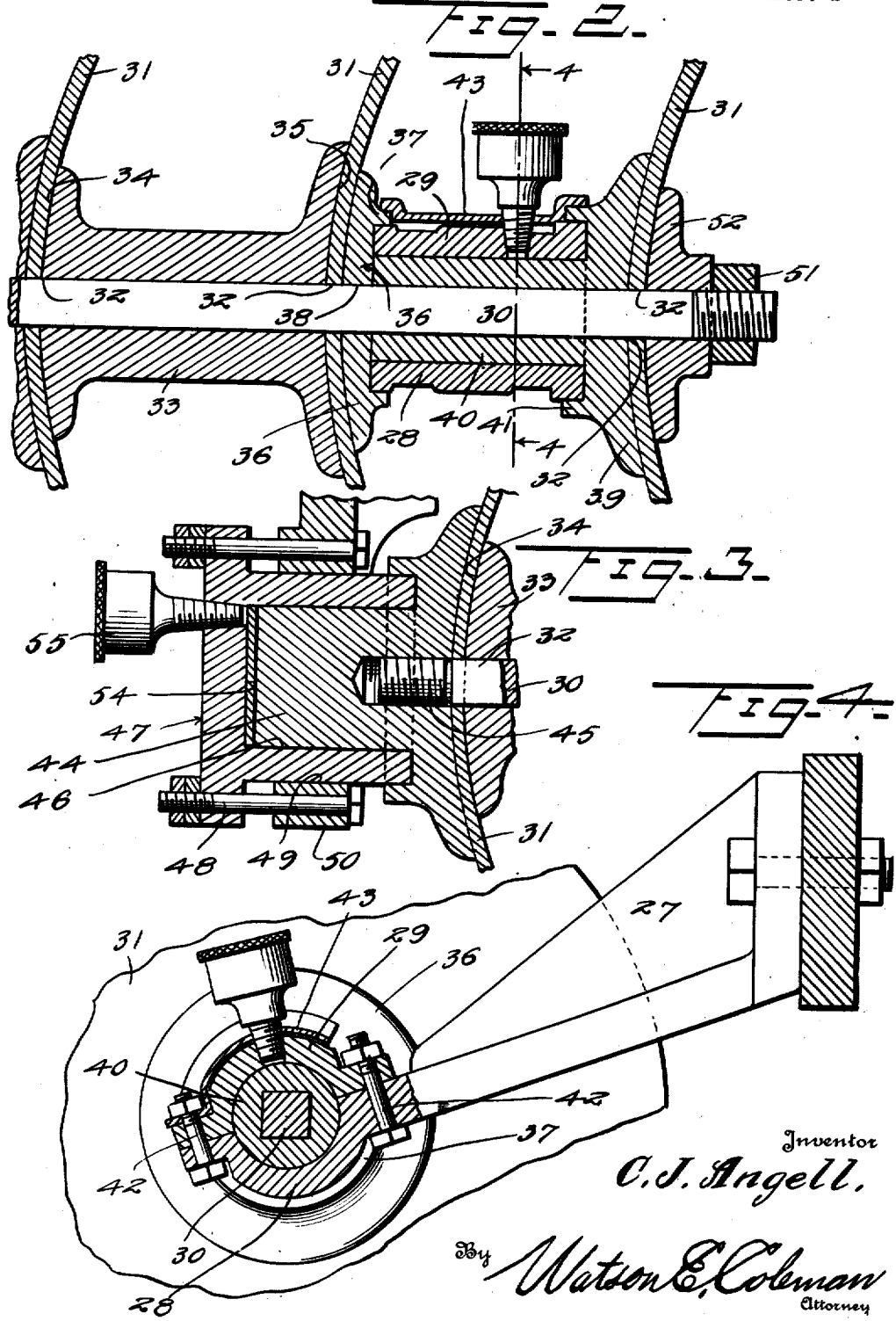

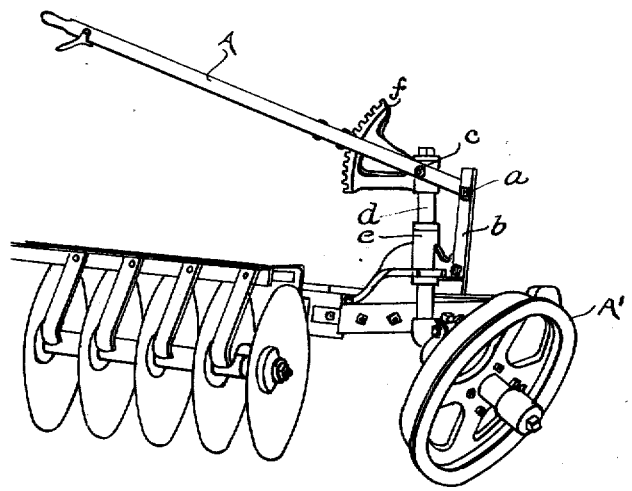
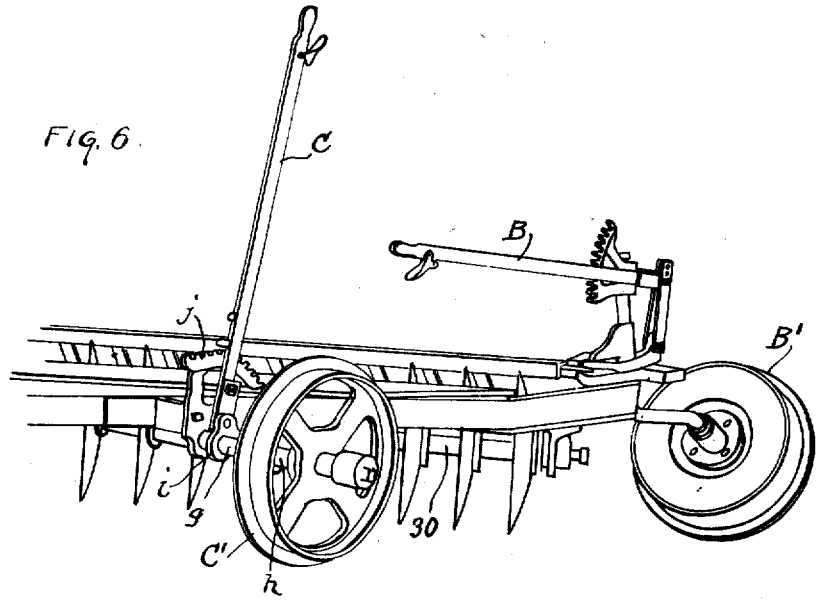

1,615,499

UNITED STATES PATENT OFFICE.

CHARLIE J. ANGELL, OF PLAINS, KANSAS.

ONE-WAY DISK PLOW.

Application filed May 11, 1926. Serial No. 108,373.

The primary purpose of my invention and of the plow embodying it is to produce, as I do in practice, a new and different seed bed from those which have heretofore resulted from the use of disk plows.

The seed bed which my plow produces needs no harrowing following the operation of this plow on the soil. My seed bed is ready for the planting drill when this plow has done its work. In my seed bed no air pockets or spaces are left or formed as the result of the action of the disks on the soil. To the contrary my seed bed is characterized by two essential qualities or conditions:

(a) The mass of soil, three to six inches in depth is without clods or lumps but in a fine and compact state, which I best can describe by saying that the bed is homogeneous or of uniformity of structure; and substantially smooth or free from pronounced ruts on the surface.

(b) There are no air spaces or unoccupied places or pockets in the bed because my disks do not dig up the soil in the sense of scooping out and turning over large fragments or strips, which when mixed with the finer portions of the soil leave spaces or air pockets forming chasms across which the wheat roots will not pass or project themselves, and will thus produce dwarfed wheat stems or no wheat stems at all due to the perishing of the seed for want of sufficient plant food and sufficient root depth.

With my plow these chasms are entirely eliminated and avoided in the seed bed because my disks have two positions or relations to the soil as they treat it; namely, they stand substantially or practically vertical or perpendicular to the surface, and at an angle to the line of draft so that the work of each succeeding disk overlaps the path of soil treated by the preceding disk, the disks being very numerous and preferably only about six inches apart, measuring between their vertical edges, so that they do not scoop out or dig into the soil and lift up clods or slices, but merely loosen or cultivate the soil by a sort of grinding action in a broad strip equal to the width of the machine measured laterally from the line of the first disk across to the line of the last in the series.

In one of the views of my drawings I illustrate the structure or nature of my seed bed as compared with seed beds heretofore produced by disk plows which have dug into the soil and scooped up large pieces or flakes, resulting in the chasms or pockets in the seed beds and the production of impaired crops of low yield compared with the yield I have obtained in the practice of my vocation as a wheat farmer in which the plow set forth herein has been used in large numbers over extensive fields.

Accordingly, the production of such homogeneous seed bed is the object of my invention, which object is carried into practical effect by the plow herein shown and described as one embodiment of the invention. The mechanical organization and construction will be hereinafter described.

Among the features of my invention which contribute to the production of the practical results above alluded to, is what I term my 3-point adjustable supports for the main frame, each of said supports being comprised of a wheel, one wheel for each of three selected positions with respect to the frame; one such wheel being at the forward right side; another at the rear left-hand side and the other at an intermediate point at the left side of the general frame; whereby the frame is properly supported with respect to the ground and is made adjustable to and from the ground at said three points to properly position the plowing disks with respect to the soil and the depth of the cultivation they are to perform.

And further, my invention comprehends the main frame and its said 3-point adjustable supports combined with a series of disks and their supporting shaft mounted in bearings carried by the frame and at an angle to the line of draft, with the disks positioned in a plane substantially perpendicular to the soil; whereby the frame and through it these disks can be adjusted to various positions or distances with respect to the soil or field surface, so as to plow the land at various depths according to the adjustment,—the 3-point adjustment features bringing about a capacity to nicely position the axis of the disks with respect to the field surface.

And another feature which I would emphasize comprehends the main frame, a series of disks having their axis at an angle to the line of draft, and a shaft-structure upon which said disks are mounted, together with a thrust-resisting bearing carried by the general frame and located at the rear end of such shaft-structure, so as to resist the combined lateral-thrust action of all of the disks.

Figure 1 is a plan view of a plow constructed in accordance with my invention;

Figure 2 is an enlarged vertical sectional view taken through the disks and shaft at the forward end of the shaft;

Figure 3 is an enlarged vertical sectional view taken through the thrust at the rear end of the shaft;

Figure 4 is an enlarged sectional view on the line 4—4 of Figure 2;

Fig. 5 is a side elevation comprising one of the 3-point adjustable connections,—that at the rear left-hand corner of the machine;

Fig. 6 is a similar view comprising another of the 3-point adjustable connections,—that at the middle left-hand side of the machine.

Referring now more particularly to the drawings, the plow includes a main frame comprising a main beam 10 arranged at an angle to the line of draft, as indicated by the arrow of Figure 1. This main beam is of approximately the same length as the disk gang, generally indicated at 11, which is to be employed with the machine and has at its rear or trailing end an angular extension 12 which approximately parallels the line of draft and is rearwardly directed. To the opposite end of the main frame beam 10 is secured a bracket 13 which includes an angular portion 14 which likewise extends approximately parallel to the line of draft and is forwardly directed. To the approximate center of the main frame beam 10 is secured the rear end of a forwardly directed brace 15, the forward end of which is approximately horizontally aligned with the forward end of the forwardly directed portion 14 of the bracket 13. Between the forward ends of the brace 15 and member 14 is pivoted a transversely extending draft bar 16 to which is connected the necessary draft elements 17 for attaching the plow to a tractor.

Immediately rearwardly of the draft beam 16, the brace 15 and extension 14 have secured thereto the angular end portions 18 of a transverse brace bar 19. The bolts employed for connecting the brace bar 19 to the forward end of the brace 15 likewise serve as a means for securing to the brace bar and brace the forward end of a further or side brace 20, the rear end of which has an angular portion lying flatly against and secured to the angular extension 12 of the main beam 10. Secured to the transverse brace 19 immediately adjacent that end thereof connected to the brace 15 is the forward end of a brace 21, the rear end of which is secured to the beam 10 adjacent the forward end thereof. The braces 21, 15 and 20 combine with one another to provide a truss structure rigidifying the main frame beam 10 and resisting all tendency of this frame beam to twist under the strain placed thereagainst by the disk gang 11. A further brace 22 paralleling the brace 15 and secured at its forward end to the angular side brace 20 at its rear end to the main frame beam further assists in stiffening the main frame beam. The bracket 13 provides a mounting for an adjustable wheel lift 23, while from the braces 15 and 20 are supported hangers 24 and 25 for a second adjustable wheel lift approximately transversely aligning with the middle of the gang. The angular end portion 12 of the main frame beam provides a mounting for a third adjustable wheel lift 26.

Secured to and extending rearwardly and slightly downwardly from the rear face of the main beam 10 at longitudinally spaced points are bearing arms 27. Each of these bearing arms is formed at its rear end with one-half 28 of a bearing, the opposite half 29 of which is made in the form of a removable bearing cap abutting the upper surface of the arm and which accordingly bears the strain of upward thrust of the disk gang. Thus, in making replacements necessitated by wear, the replacement of the bearing cap 29 is all that is necessary, there being practically no wear upon the bearing section 28 of the arm 27. Directed through the bearings is a square shaft 30 upon which is mounted a series of disks 31, each having an opening 32 fitting the shaft. Between adjacent disks 31, with the exception of those between which are disposed bearings for the shaft 30, are arranged spools or spacers 33, each having a bore fitting the shaft 30 and each having at one end a convex face 34 to engage and fit against the concave face of a disk and at its opposite end a concave face 35 for engagement against the convex face of a second disk. Where bearings are inserted between adjacent disks, the disk whose concave face opposes the bearing has arranged thereagainst a washer 36 having a dust flange 37 at one side face for engagement with the bearing and having its opposite face shaped to conform to the shaping of the disk face. These washers have the openings 38 thereof squared so that they fit the shaft 30 and rotate therewith.

The disk, whose convex face opposed the bearing is abutted by a washer-like flange 39 formed upon the end of a sleeve 40 rotatably fitting the bearing and extending entirely therethrough for engagement with the washer 38. The bore of this sleeve fits the shaft 30 and the flange thereof has a dust rim 41 for engagement with the bearing. One of the bolts 42 which retains the cap 29 in position is employed as a means for mounting upon the upper surfaces of the bearing additional dust guards 43. Abutting the outer or convex face of the disk 31 at the trailing end of the shaft is a bearing head 44 which is threaded upon the threaded end 45 of the squared shaft 30. This head fits within the bore 46 of a thrust member 47 which is adjustable, as by means of bolts 48, through an opening 49 formed in a heavy rigid bracket 50 secured to and depending slightly from the angular extension 12 of the rear end of the main frame beam 10.

Attention is directed to the fact that the angle of the arms 27 is so slight that the shaft 30 and its associated parts lies practically directly in the rear of the main frame beam 10, as differentiated from those structures where the disk gangs are disposed beneath the main frame beam. This results in the material reduction of the tendency to twisting strains applied by the disk gang to the main frame beam and such twisting strains as are applied are removed by the truss structure formed by the braces 15, 21 and 20, as hereinbefore described. In operation, the wheel of the wheel lift 23 operates in the furrow of the last cut while the wheel of the wheel lift 26 operates in the furrow of the newly formed cut. These wheels are suitably inclined to resist the tendency to side draft and this tendency is further reduced by the land wheel of the wheel lift 25. Due to the fact that each of the disks is rigid to the shaft 30 and the entire structure revolves as a whole, there is no tendency whatever of these disks to lag, due to contract with an obstruction. Where the ordinary plow disk can be checked in its rotation during operation by grasping the same with the hand, it has been found impossible to check rotation of the disks of a gang of this construction while in operation by the use of pry forcibly engaged with one of the disks.

The advantage in the reduction of the amount of draft necessary provided by this rolling construction is very considerable, being approximately one-half in structures of the same size, so that a farmer owning a tractor capable of pulling a five foot disk plow of the ordinary construction can use the same tractor in pulling a ten foot disk plow of the construction hereinbefore referred to. Since the disks, spacers and the like are firmly clamped to one another between a nut 51 and washer 52, mounted upon the opposite end of the shaft 30 from the head 44, any tendency to independent rotation on the part of the disks is prevented and proper rotation is assured. The purpose of this interlocking of the several disks is to give any disk, or any group of disks, should it or they become clogged by trash or other materials tending to prevent their rotation, the benefit of the torque or rotative movement of all the other disks so as to overcome the obstruction of the particular disk or group of disks then about to be clogged. In this way clogging of any of the disks or any group of disks is entirely avoided. This results in the making of the seed bed more perfect and more uniform; and also saves the operator the loss of time and the physical labor incident to getting down from his machine and endeavoring to remove the obstructing accumulation. At the same time, an integral structure is provided which may be readily adjusted with the adjustable thrust bearing 47 to compensate for any wear which might occur. This wear is, however, extremely unlikely to occur, due to the fact that the shaft rotates very slowly and, of course, at the center portion of the sliding head, there is practically no motion which would have a tendency to wear. To decrease any tendency to wear, grease is forced between a steel thrust plate 54 and the adjacent face of the head 44 by a suitable grease cup 55 carried by the bearing 47. This bearing 47 is in line with and carries practically all side thrust of the shaft, so that the strain which must be borne by the arms is substantially reduced to that strain necessary to resist elevation of the disks. Due to the rigid construction, the entire weight of the frame acts to urge the disks downwardly and maintain the same at the desired cutting level.

Since the construction hereinbefore set forth is obviously capable of a certain range of change and modification without materially departing from the spirit of the invention, I do not limit myself to such specific structure except as hereinafter claimed.

Referring again to the 3-point adjustable supports for my frame, I call attention to the value and utility of these features. For instance, by manipulating the lever A I can adjust relatively to the ground the forward right-hand corner of the machine. When the first trip across a field is to be made this adjustment will be such as to properly position the frame with the furrow wheel A' riding on the surface, while thereafter the adjustment will have relation to the wheel A' travelling in a furrow. Once this corner of the machine is adjusted properly with respect to the surface, I likewise adjust the rear left-hand corner by manipulating the lever B, which through the connections shown in Fig. 5 will enable the user to properly place this position of the machine with respect to the ground.

Thus by the proper manipulation of the levers A and B the forward and rear ends, the one at the right and the other at the left of the machine, will be adjusted with such relation to the ground as to cause the disk shaft and the disks themselves to assume with respect to the soil what I would term their initial adjusted relation or position.

Now to give the disks their final adjustment with respect to the ground, and to cause them to tend, as they roll forward, to press into the soil, I manipulate the lever C to lower the frame with respect to the supporting wheel C', and thus give the disks their final adjusted position. When the frame is lowered or raised through the lever C and its connections it turns on the centers of the wheels A' and B' slightly, with a general lowering effect or general lifting effect, as may be desired in giving the disks their final working position.

It will further be observed that the 3-point supports and the adjustments just described cooperate not only with the disks in their relation to the ground, but cooperate also with the position of the disks with respect to the line of draft, with their angular position, and with their location in part at points forward of the axis of the wheel C' and in part rearward of that axis. So that this angular position of the disks with respect to the line of draft is made to work in with the 3-point adjustable supports.

Referring to Fig. 5 it will be seen that the lever A is fulcrumed at $a$, to a standard $b$, carried by the frame, and is pivoted at $c$, to a collar on the shaft $d$, which latter is slidably mounted in a fixed sleeve $e$, also carried by the main frame. The rack $f$, supported by said collar, is adapted to hold the lever in any adjusted position. By raising upward on the free end of the lever the adjacent part of the frame will be lowered on the wheel spindle $d$, and thereby result in bringing the wheel and frame nearer together; or in other words, the frame will be depressed with reference to the wheel and will thus be lower.

A reverse or downward movement of the lever will produce the reverse effect and lift the frame from the ground.

Referring to Fig. 6 the lever C, it will be seen, is connected to the crank portion $g$, of the wheel spindle $h$ by a casting $i$. This connection is rigid. Therefore when the lever C is moved forwardly or rearwardly it will cause the spindle crank to partially rotate and thus lower or raise the frame with respect to the ground. A toothed rack $j$, secured to the frame, is adapted to hold the lever C in any adjusted position.

The detail constructions here described are the ones I have employed, but it will be understood that variations from these forms of construction may be used.

I would further observe that while I prefer to make the disk shaft 30 of a continuous piece, yet that is not indispensible since the complete shaft might be otherwise made than of one continuous piece. It is the angular position of this shaft and its disks to the line of draft which causes such severe side thrust to the shaft as to require the side thrust bearing before referred to. And by utilizing but one thrust bearing for the whole shaft I am enabled to eliminate costs which would be incurred were one or more of the supporting bearings for this shaft made to act to resist side thrust as well.

While for convenience and clearness I have referred in the specification, and will refer in the claims, to the wheel A' being on the right-hand side and the wheel B' at the left side, as also the wheel C' being at the left, which I have done because the machine illustrated is what is known as a right-hand machine, nevertheless my mechanism is equally adapted to making a left-hand machine, in which case wheel A' would be at the left, wheel B' at the rear right and the wheel C' also at the right. It will therefore be understood that these terms right and left are convertible according to whether the machine is a right-hand machine or a left-hand machine.

Referring to the performance of my plow and particularly its disk functions, it may be assumed that the disks are say fifteen inches in diameter and that the gang of disks in the plow will be set to enter the soil a depth of say three inches and be positioned at an angle of, say, 37 degrees to the line of draft.

It will be observed that as the machine moves forward each disk cultivates a certain zone or strip and that the succeeding disk overlaps the next disk ahead, and so on from disk to disk, so that the combined effect of all the disks is that of cultivating the entire swath made by the whole gang of disks, say ten feet in a machine having twenty disks, the vertical or perpendicular position of the disks preventing any undercutting and lifting of the soil in clods, lumps or strips. Here is a peculiar feature or action by the disks obtained by their overlapping relative positions brought about by the angle of their axes to the line of draft and by their vertical or perpendicular position.

As the machine goes back and forth across the field it thus produces the seed bed in progressive or adjoining swaths, the soil in each being pulverized, the disks overlapping and the vertical or perpendicular position of the disks avoiding the digging-in action with the resulting objectionable lumps or clods. In this way a fine seed bed is made so that when the seeds are planted at a depth of say one to one and a half inches, the roots will find a homogeneous bed through which to project themselves and from which to draw plant food. This improved seed bed compared with the old kind of non-homogeneous bed has produced in the wheat country, where I live and farm, crops 15 per cent and upward greater in yield in the same neighborhood and under like climatic and soil conditions.

In non-homogeneous or chasmed seed beds, air-spaces, pockets or chasms prevent the proper growth of seeds. It is a law of nature that wheat roots will not project themselves across a chasm or open space where there is no soil to feed them. They will stop at the ceilings of the chasm and either cause the plant or stem to be dwarfed or withered and die, in either case seriously reducing the crop due to the millions of chasms, and a like number of dwarfed or perished stems in even an ordinary sized field. It is rare that a wheat root will divert itself and go around a chasm, so rare as to be negligible.

I have made these observations in order to make plain the nature of the seed bed I obtain from this plow, and also to make plain the distinction in the character and value of the resulting seed bed.

Again, with my seed bed no subsequent harrowing is required. I do away with harrowing altogether and therefore with the expense and time incident to that step or operation. But in the case of the old seed bed with the chasms harrowing is necessary and is always practiced in order to break up the clods, strips or lumps of soil for at least some distance down into the bed. But this harrowing step has proved to be insufficient or inadequate with respect to making the bed homogeneous throughout its depth; hence there are left these chasms or air spaces through which the roots will not attempt to pass.

I hereby reserve for subject matter of invention and claims, embodied in a copending application, Serial No. 157,562, filed Dec. 28, 1926, the feature of so relatively positioning the line of draft of the draft devices and the axial line of the disk shaft, with a line projected from substantially the center of the forward right-hand and rear left-hand ground wheels, and another line projected from the axis of the forward left-hand wheel, that said lines will intersect one another within a prescribed zone located essentially midway, and overlapping, the disk shaft. While this feature is shown in the drawings hereof it is not claimed herein but is reserved to be covered in a separate patent expected to issue on said copending application.

I claim:—

1. In a disk plow, the combination with a general frame, of a 3-point adjustable support, one support near the forward right-hand end, one near the rear left-hand end and one at the left side intermediate of the front and rear ends, a series of disks and an axial support therefor connected to the frame, and to which the disks are secured, such disks being substantially perpendicular to the horizontal and such axial support at an angle to the line of draft, and a thrust-bearing in line with the shaft.

2. In a disk plow, the combination with a general frame, of a 3-point adjustable support, one support near the forward right-hand end, one near the rear left-hand end and one at the left side intermediate of the front and rear ends, a disk shaft and a series of disks secured thereto and positioned at an angle to the line of draft and located generally between the right-hand forward and the left-hand rear adjustable supports and rearward of the left-hand forward adjustable support, and a suitable thrust-resisting mounting for said shaft arranged in line therewith.

3. In a disk plow, the combination with a main frame, of a series of disks and a shaft therefor, supporting bearings for the shaft carried by the frame, and a thrust-bearing located near the rear portion of the frame and held thereby in line with the shaft to resist the side thrust of said shaft.

4. In a disk plow, the combination with a main frame, a shaft, a series of supporting bearings, and a thrust bearing in line with the shaft, all carried by the frame, of a series of disks on said shaft, said shaft having an angular cross section to interlock rotatably with all the disks, the position of such shaft being at an angle to the draft line of the machine; whereby through the thrust bearing lateral thrust or pressure of the shaft is resisted and whereby through the angular relation of the shaft and disks all of the disks are interlocked equally with the shaft.

5. In a disk plow, the combination with a general frame, draft devices and ground wheels to resist lateral swerving of the machine, of a disk shaft mounted in journals connected with the frame at an angle to the line of draft, a series of disks rigidly mounted thereon with the active cultivating segment of each succeeding disk overlapping said segment of the preceding disk, and with the forward face of each disk substantially vertical or perpendicular to the surface, whereby the whole surface of the swath covered by the machine is cultivated and a homogeneous seed bed is produced without chasms due to clods.

6. In a disk plow, the combination with a general frame, draft devices and ground wheels to resist lateral swerving of the machine, of rearwardly extending arms secured to the frame and carrying bearings, a disk shaft mounted in the bearings in said arms and occupying an angular position to the line of draft, a thrust bearing for said shaft and a series of concavo-convex disks rigidly mounted on said shaft so that all the disks will turn together, such disks having their forward faces substantially vertical or perpendicular to the surface, the angle of said shaft causing the segment which enters the soil of each succeeding disk to overlap the segment of the preceding disk; whereby through the combined action of the substantially vertical or perpendicular position of the disks and said overlapping of the disks the soil is cultivated at desired depths and a homogeneous seed bed is produced without chasms due to clods.

7. In a disk plow, a wheel supported frame including a rigid main frame beam disposed at an angle to the line of draft, a plurality of rigid bearing arms extending rearwardly from the beam at a slight angle to the horizontal, a structure rotatably mounted in bearings carried by the rear ends of the arms including axially aligned disks held against rotation with relation to one another, a shaft upon which the disks are mounted, the main frame beam having at its rear end an angular extension, a bearing supported from said angular extension with which the rear end of the shaft is engaged and forwardly converging braces secured at their rear ends to said main beam and at their forward ends to one another.

8. In a disk plow, a wheel supported frame including a rigid main frame beam disposed at an angle to the line of draft, a plurality of rigid bearing arms extending rearwardly from the beam at a slight angle to the horizontal, a structure rotatably mounted in bearings carried by the rear ends of the arms including axially aligned disks held against rotation with relation to one another, a shaft upon which the disks are mounted, the main frame beam having at its rear end an angular extension, a bearing supported from said angular extension with which the rear end of the shaft is engaged, a bracket extending forwardly in the line of draft from the main beam, a brace extending in the line of draft from the approximate center of the main beam, a transverse brace connecting said bracket and the forward end of the first named brace and other braces converging upon the point of connection of the first named braces and secured thereto.

In testimony whereof I hereunto affix my signature.

CHARLIE J. ANGELL.

the soil is cultivated at desired depths and a homogeneous seed bed is produced without chasms due to clods.

7. In a disk plow, a wheel supported frame including a rigid main frame beam disposed at an angle to the line of draft, a plurality of rigid bearing arms extending rearwardly from the beam at a slight angle to the horizontal, a structure rotatably mounted in bearings carried by the rear ends of the arms including axially aligned disks held against rotation with relation to one another, a shaft upon which the disks are mounted, the main frame beam having at its rear end an angular extension, a bearing supported from said angular extension with which the rear end of the shaft is engaged and forwardly converging braces secured at their rear ends to said main beam and at their forward ends to one another.

8. In a disk plow, a wheel supported frame including a rigid main frame beam disposed at an angle to the line of draft, a plurality of rigid bearing arms extending rearwardly from the beam at a slight angle to the horizontal, a structure rotatably mounted in bearings carried by the rear ends of the arms including axially aligned disks held against rotation with relation to one another, a shaft upon which the disks are mounted, the main frame beam having at its rear end an angular extension, a bearing supported from said angular extension with which the rear end of the shaft is engaged, a bracket extending forwardly in the line of draft from the main beam, a brace extending in the line of draft from the approximate center of the main beam, a transverse brace connecting said bracket and the forward end of the first named brace and other braces converging upon the point of connection of the first named braces and secured thereto.

In testimony whereof I hereunto affix my signature.

CHARLIE J. ANGELL.

DISCLAIMER.

1,615,499.—*Charlie J. Angell*, Plains, Kans. ONE-WAY DISK PLOW. Patent dated January 25, 1927. Disclaimer filed April 15, 1929, by *Christie D. Linville*, administratrix of said Angell, and *The Ohio Cultivator Company* (not of record) licensee.

Hereby enter this disclaimer limiting said claims 1 and 2 of said patent as follows:

By restricting the "3-point adjustable support" of said claim 1 to include "leverage devices mounted on the machine and adapted to apply a lifting force at each adjustable support."

By restricting the "3-point adjustable support" of said claim 2 to include "a lever for each point of adjustment, all of the levers being mounted on the machine and constituting machine-carried mechanism."

[*Official Gazette April 30, 1929.*]

DISCLAIMER.

1,615,499.—*Charlie J. Angell*, Plains, Kans. ONE-WAY DISK PLOW. Patent dated January 25, 1927. Disclaimer filed April 15, 1929, by *Christie D. Linville*, administratrix of said Angell, and *The Ohio Cultivator Company* (not of record) licensee.

Hereby enter this disclaimer limiting said claims 1 and 2 of said patent as follows:

By restricting the "3-point adjustable support" of said claim 1 to include "leverage devices mounted on the machine and adapted to apply a lifting force at each adjustable support."

By restricting the "3-point adjustable support" of said claim 2 to include "a lever for each point of adjustment, all of the levers being mounted on the machine and constituting machine-carried mechanism."

[*Official Gazette April 30, 1929.*]